United States Patent [19]

Dunlap et al.

[11] Patent Number: 5,216,552
[45] Date of Patent: Jun. 1, 1993

[54] VIDEO CASSETTE RECORDER HAVING DUAL DECKS FOR SELECTIVE SIMULTANEOUS FUNCTIONS

[75] Inventors: Robert T. Dunlap; Richard A. Lang, both of Scottsdale, Ariz.

[73] Assignee: Go-Video, Inc., Scottsdale, Ariz.

[21] Appl. No.: 238,199

[22] Filed: Aug. 30, 1988

Related U.S. Application Data

[63] Continuation of Ser. No. 48,521, May 6, 1987, Pat. No. 4,768,110, which is a continuation of Ser. No. 652,820, Sep. 20, 1984, abandoned.

[51] Int. Cl.⁵ ............ H04N 5/782; H04N 5/268; G11B 5/86
[52] U.S. Cl. .................... 360/33.1; 360/15; 360/61; 358/181
[58] Field of Search ............ 358/188, 191.1, 335; 360/13-14.3, 15, 33.1, 16, 17, 61-63, 69; 369/6-12, 84; 455/3, 344

[56] References Cited

U.S. PATENT DOCUMENTS

| | | | |
|---|---|---|---|
| 3,560,666 | 2/1971 | Bookman | 369/7 |
| 4,031,548 | 6/1977 | Kato et al. | 358/335 |
| 4,577,239 | 3/1986 | Sougen | 360/15 |

Primary Examiner—Jerry Smith
Assistant Examiner—Steven R. Garland
Attorney, Agent, or Firm—Jerry Cohen; Harvey Kaye; Ed Paul

[57] ABSTRACT

A video cassette recorder and taping system is disclosed in which two video cassette decks are included within a single housing. Selection switches are provided so that a prerecorded tape may be displayed from a tape located in one video cassette unit deck while one of a plurality of inputs is being recorded on another video tape located in the second video cassette unit deck.

8 Claims, 3 Drawing Sheets

VIDEO CASSETTE RECORDER HAVING DUAL DECKS FOR SELECTIVE SIMULTANEOUS FUNCTIONS

REFERENCE TO RELATED APPLICATIONS

This is a continuation application of application Ser. No. 07/048,521 filed on May 6, 1987, which issued Aug. 30, 1988, as U.S. Pat. No. 4,768,110, which itself was a continuation application of application Ser. No. 06/652,820 filed on Sep. 20, 1984, now abandoned.

BACKGROUND OF THE INVENTION

This invention relates to a dual deck video cassette recorder system that enables prerecorded material to be transferred to a blank tape in a single unit.

The conventional video cassette recorder (VCR) as known heretofore is provided with only a single deck for receiving a video tape cassette having prerecorded material thereon for viewing, or for receiving a blank tape cassette therein for recording on the tape from the TV signal. If the user is employing the VCR to watch a prerecorded program, he cannot simultaneously use the VCR to record. Thus, if recording material from a prerecorded tape onto a blank tape is desired, it was necessary to utilize a second video cassette recorder in combination with the first VCR. In this instance, one VCR could be used for recording while the other VCR would be used for playing the prerecorded tape.

As used herein, "deck" has its common industry meaning of the electrical/mechanical framework for mounting a VCR, as combined into the VCR core structure per se (i.e., cassette mount and drive, magnetic heads for record, play and control functions, as well as associated electronics).

SUMMARY OF THE INVENTION

The present invention is directed to a video cassette recorder and taping system which includes at least two decks for receiving video tape cassettes therein. An output selection switch is provided for selection of the video output for the monitor from among a plurality of signals including the output signal from either the first or the second video cassette recorder and the input to the first VCR. Other standard signals which are selectively directed through the output selection switch include a TV tuner, a video line, and a camera. A second selection switch is also provided for selecting the desired recording input. One of the lines connected to this switch is also connected directly to the second video cassette recorder. Thus, a prerecorded tape that is located in the second video cassette recorder may be recorded on a blank tape cassette located in the first deck, while selection of a program for monitor viewing is unrestricted among the original alternatives. It is also seen that the present system provides the significant advantage that a prerecorded tape may be viewed during a recording session.

Other objects, features and advantages of the invention shall become apparent as the description thereof proceeds when considered in connection with the accompanying illustrative drawings.

IN THE DRAWINGS

In the drawings which illustrate the best mode presently contemplated for carrying out the present invention:

DETAILED DESCRIPTION OF THE PREFERRED EMBODIMENTS

Figure 1:
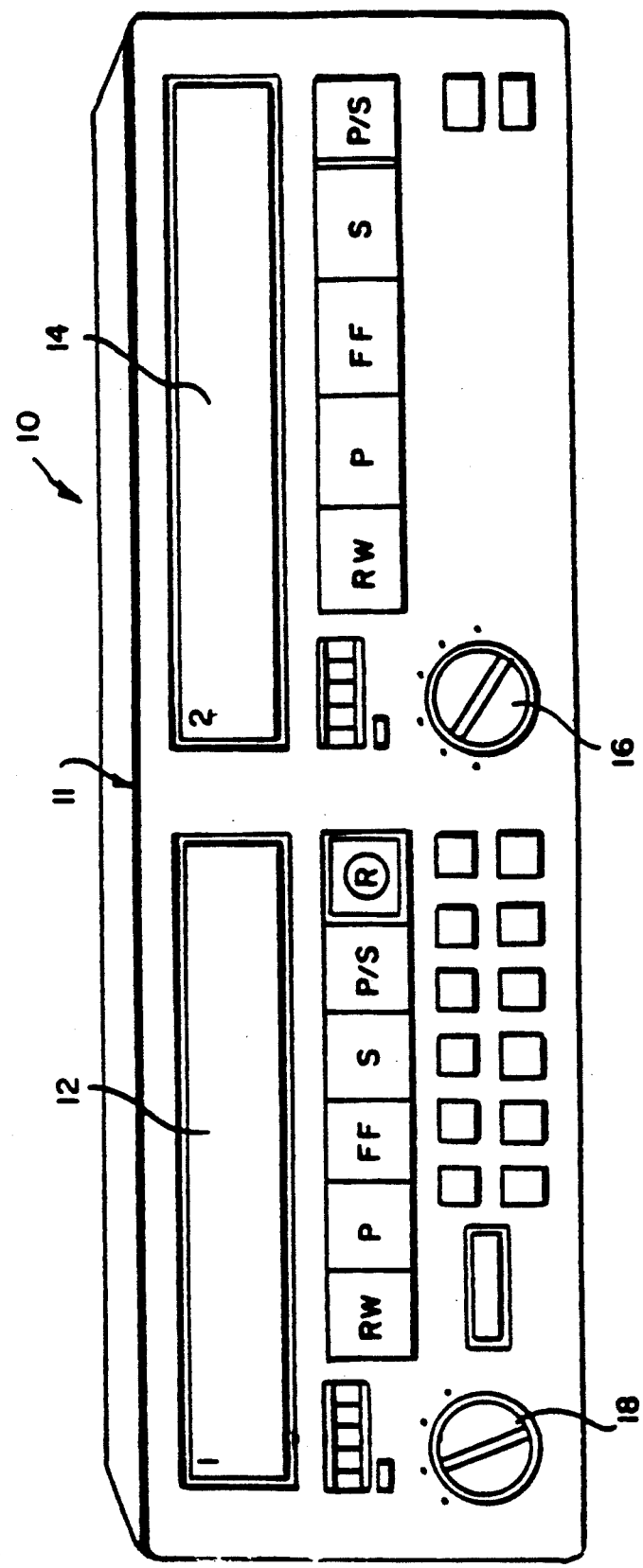
FIG. 1 is a plan view of the housing of the combined video cassette recorder and taping system as embodied in the present invention.

Referring now to the drawings and particularly to FIG. 1, the combined video cassette recorder and taping system is illustrated therein and is generally indicated at 10. The system 10 is contained within a single housing generally indicated at 11 and, as will be described, includes a dual deck arrangement for receiving conventional video tape cassettes therein. A first deck 12 (designated by the numeral "1" in FIG. 1) may be used for not only playing a prerecorded video tape located in a cassette but also may be used for recording onto a blank video tape cassette. A second deck 14 (designated by the numeral "2" in FIG. 1) is used for playing prerecorded tapes on a monitor. An output selection switch 16 is located on the front of the housing 11 below the deck 14 and, as will be described, selects the line which will be connected to the video monitor for viewing. A recording selection switch 18 is also located on the front of the housing 11 below the deck 12 and is provided for selecting the input line from which a program or prerecorded material will be recorded onto a blank video tape cassette that has been inserted into deck 12. The recording selection switch 18 is only used when a blank tape is inserted into first deck 12 for recording thereon.

Figure 2:
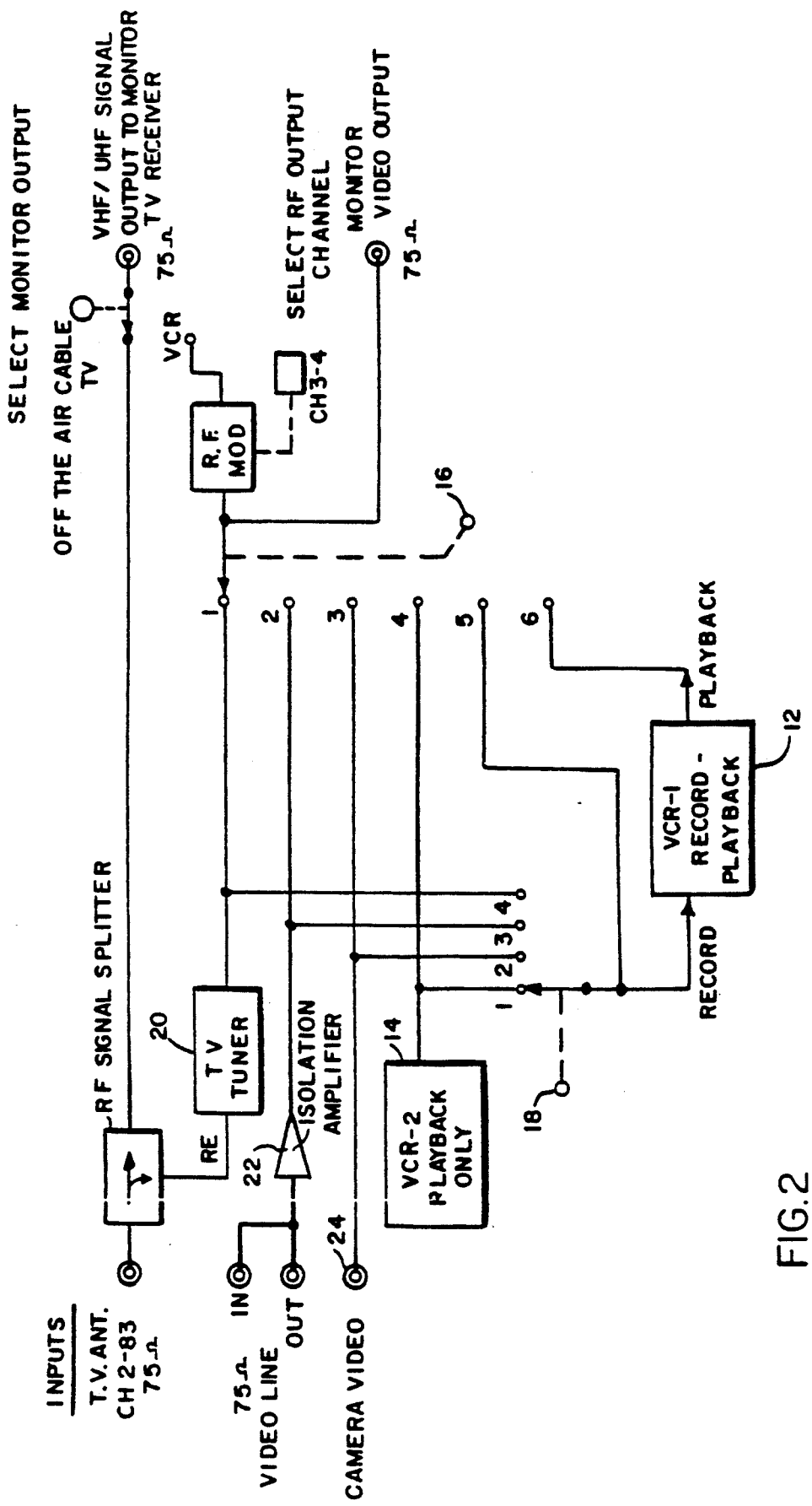
FIG. 2 is a schematic illustration of the combined video cassette recorder and taping system of the present invention.

Referring now to FIG. 2, the video cassette recorder and taping system as embodied in the present invention is schematically illustrated; and in this connection it is understood that the electrical components as illustrated in block diagram form are composed of conventional circuitry well known in the art. As shown in FIG. 2, the electrical inputs into the system include a TV signal that is directed through a TV tuner 20, a video input that is directed through an isolation amplifier 22, a camera video input socket 24, and the second video cassette recorder which receives a video tape cassette by way of deck 14. All of the input signals are selectively directed into the first video cassette recorder that is accessed through the deck 12 for recording onto a blank tape located therein. The selection switch 18 selects from among the four input lines, the input for which recording onto the blank tape is desired; and although the inputs are shown as being directed to the recorder 12, it is also possible to implement the system using a conventional common bus for the inputs.

The input signals may also be directed to the TV monitor for video display thereon. For this purpose, the output selection switch 16 through the switch positions 1-4 thereof is moved to the appropriated position for selecting the desired signal among the four inputs for connection to the TV monitor. In addition, the selection switch 18 through the switch positions 1-4 thereof is used to select an input line to the first video cassette recorder 12 for direct connection to the TV monitor. As shown in FIG. 2, the output line from the first video cassette recorder 12 as selected by the output switch 16 is connected through switch position #6 thereof to the video monitor for viewing. At the monitor, conventional means known to those skilled in the art may be used for selecting the appropriate output channel for displaying the signals received through the output selection switch 16.

The combination of the selection switches 16 and 18 as incorporated in the present invention enables a versatility of operation that was not available in the previously known single deck VCR systems of the prior art. By utilizing the dual VCR recorder system of the present invention, it is now possible by use of the selection switch 18 to record either a TV program through the TV tuner 20 that is connected to switch position #4, a video input that is connected to switch position #3, or a camera input that is connected to switch position #2, while at the same time viewing on the TV monitor a prerecorded tape that has been inserted into the second deck 14 and that is operable through the second VCR and movement of the selection switch 16 to position #4. It is also possible by use of the subject invention to duplicate material as prerecorded on a tape that is inserted into the video cassette recorder deck 14 by locating the selection switch 18 at position #1 while displaying the prerecorded program, which is accomplished by locating selection switch 16 at position #5. In this manner, the material prerecorded on the cassette tape located in the deck of the second VCR can be edited, for example, by leaving out commercials, on a blank cassette tape located in the deck of the first VCR. The cassette tape located in the deck of the second VCR can then be viewed while the edited version is produced in the deck of the first VCR.

Thus, this switch arrangement allows the selective connection within the housing of:

1. the extracted off-the-air video-audio to the first deck and independently connecting the second deck to the television receiver via the modulator and output jack;

2. the second deck to the first deck directly for dubbing a played out video-audio source signal of a cassette in said second deck directly to a cassette in the first deck without passing the source signal through an R.F. modulator in the course of dubbing, while independently allowing direct transmission of an antenna signal of the system to the television receiver via the housing without passage through the tuner and modulator within the housing or with passage of the antenna signal or the source signal through the modulator within the housing;

3. (a) input jacks to the first deck while allowing the second deck to be connected to the television receiver via the modulator; or 4. the off-the-air signal simultaneously to the receiver and the extracted video-audio therefrom to the first deck.

Figure 3:
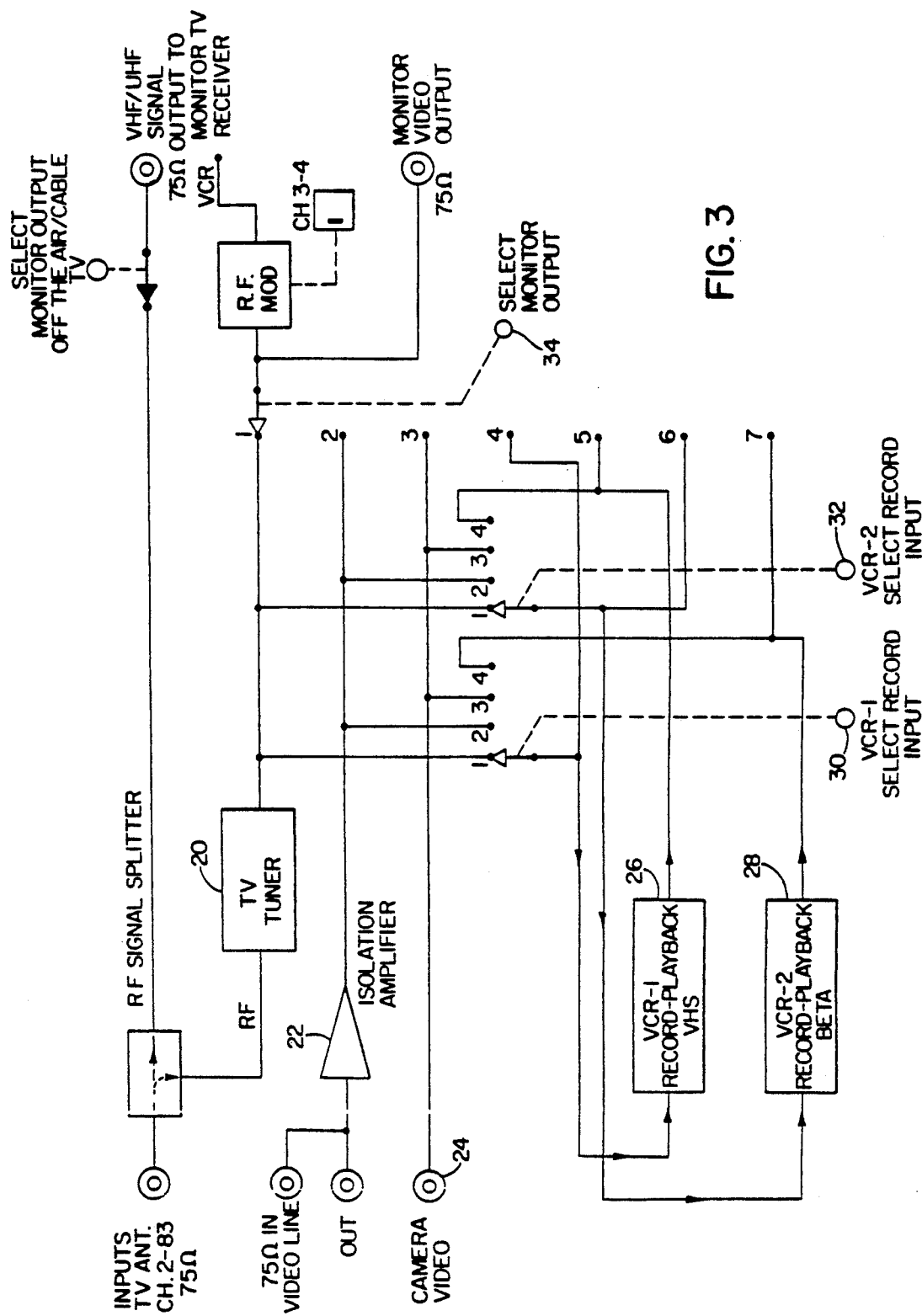
FIG. 3 is a schematic illustration of a modification of the subject invention.

Referring now to FIG. 3, a modified form of the invention is illustrated and has application in those instances in which the prerecorded vide tape cassette is not compatible normally with the blank video tape cassette on which the prerecorded information is to be transferred. Presently there are two so-called video cassette recorder systems in use. One system is normally referred to as the "VHS" system, and those VCR's that are designed to play a VHS tape incorporate a deck therein that is shaped and configured to receive the VHS cassette. The other system presently in use is known as the "Beta" system and is used in connection with the Sony Betamax video cassette recorder. The Betamax cassette is designed and configured for reception only in the deck of the Beta VCR. Thus, a Beta tape cassette cannot be received in a VHS system, and vice versa, a VHS tape cassette is not compatible with the Beta system.

On occasion it is desirable to play a Beta-type video cassette tape in a VHS system, and similarly playing a VHS tape in a Beta system on occasion has a particular advantage. The modification of the invention as illustrated in FIG. 3 provides for the dual use of either a VHS tape or a Beta tape in the same video cassette recorder.

Referring now particularly to FIG. 3, a circuit as diagrammatically illustrated and which includes known components in block form is similar in concept to the system as described hereinabove and disclosed in FIG. 2. The system illustrated in FIG. 3 also includes a dual deck arrangement, each deck comprising a video cassette recorder, VCR-1 indicated in FIG. 3 at 26 being employed for receiving a video tape cassette of the VHS type. The second deck in the system has communication with a second video cassette recorder indicated at VCR-2 and designated in FIG. 3 at 28. VCR-2 and the deck that communicates therewith is designed to receive a video tape cassette of the Beta type. VCR-1 is adapted to communicate with the TV tuner 20 for receiving a TV signal, a video input that is directed to the isolation amplifier 22, and a camera video input that communicated with the system though the socket 24. In order to select the input into VCR-1, a selector switch 30 is provided and includes switch positions numbers 1-4. Switch position #1 for selection switch 30 directs the signal from the TV tuner into VCR-1. Switch position #2 directs the signal from the isolation amplifier 22 into VCR-1, and switch position #3 directs the signal from the camera video into VCR-1. A second selection switch 32 and switch positions 1-4 therefor are disposed in parallel relation with respect to switch 30 and the switch positions thereof and directs the signals from the inputs into the Beta system as represented by VCR-2. Thus, the input signal from the TV tuner 20 is directed to VCR-2 through switch position #1 of the selection switch 32, while the signal from the isolation amplifier 22 is directed to VCR-2 through switch position #2 of the selection switch 32, and switch position #3 directs the signal from the camera video to the VCR-2.

Both VCR-1 and VCR-2 are arranged to not only record but to play back. This is in contrast to the system as illustrated in FIG. 2, wherein VCR-1 records and plays back whereas VCR-2 has the ability to play back only. The purpose of the dual system as illustrated in FIG. 3 and as described hereinabove is to enable a VHS cassette as located in VCR-1 to record information from a Beta tape as located in VCR-2. The contrary circumstances are also available, wherein a Beta system with a Beta tape located in the deck of VCR-2 can record information from a VHS tape as located in the deck of VCR-1. Switch position #4 in both switch selection switches 30 and 32 provide for connecting the output of VCR-1 with VCR-2, or conversely, connecting the output of VCR-2 to VCR-1. Thus, it is possible to record information from a tape located in VCR-1 onto a tape located in VCR-2, or conversely it is possible to record information on a tape located at VCR-2 onto a tape located at VCR-1.

As previously described in connection with the form of the invention illustrated in FIG. 2, an output switch indicated at 34 is operable to provide for playing of a prerecorded tape on the TV monitor as desired. As shown in FIG. 3, the TV tuner is connected directly to the TV monitor through switch position #1. A video line through the isolation amplifier 22 is also connected to the TV monitor through switch position #2 of switch 34. Similarly, the camera video 24 is connectable to the TV monitor through switch position #3 of switch 34. In order to record information from the TV monitor onto the tape located in the first VCR, the switch 30 is moved to switch position #1 thereof. If the tape located in VCR-1 has been prerecorded, and it is desired to view this tape information on the monitor, the selection switch 34 is moved to switch position #5. If a blank Beta tape is located in VCR-2, it is possible to record a TV program thereon by moving the selection switch 32 to position #1 thereof. If the Beta tape as located in VCR-2 has prerecorded material thereon, and it is desired to play this material on the TV monitor, then selection switch 34 is moved to position #7.

Thus, this switch arrangement allows the selective connection within the housing of:

1. the extracted off-the-air video-audio to one of said decks and independently connecting the other of the decks to the television receiver via the modulator and the output jack;

2. one deck to the other directly for dubbing a played out recorded video-audio of a source cassette in one of the decks directly to a target cassette in the other of the decks without passing the source signal through and R.F. modulator in the course of dubbing, while independently allowing direct transmission of an antenna signal of the system to the television receiver via the housing without passage through the tuner and modulator within the housing or with passage of such antenna signal or of the source signal through the modulator within the housing;

3. auxiliary input or output jacks to one or the other of said decks while allowing the other of the decks to be connected to another one of the auxiliary jacks or to the television receiver via the modulator;

4. the extracted video-audio from the off-the-air signal simultaneously to the receiver and, as extracted, one or the other of the decks which is connected to an active auxiliary jack; or 5. (a) the extracted video-audio from the off-the-air signal to both the decks for simultaneous copying onto cassettes located in both decks and, selectively, the extracted video-audio, via the modulator, or the off-the-air signal directly to the receiver; or 5. (b) either of the decks to the receiver.

Input and output jacks are indicated in FIGS. 2 and 3 at "INPUTS . . . "; "VIDEO LINE (IN), (OUT)"; "CAMERA VIDEO"; "VHF/UHF . . . "; "VCR", and "MONITOR VIDEO OUTPUT".

It is seen that the combination system as illustrated in FIG. 3 is versatile in that the system is capable of playing either a VHS or Beta tape therein for viewing on the TV monitor. Further, the system has the capability of transferring information from a Beta tape to a blank VHS tape, and conversely, the system can translate information from a VHS tape onto a Beta tape.

It is also understood that various changes and modifications to the embodiments of the invention as described hereinabove will be apparent to those skilled in the art. For example, in the systems as illustrated in both FIGS. 2 and 3, the video cassette recorders as illustrated therein can be arranged for both recording and playing. This and other changes can be made without departing from the spirit and scope of the invention and without diminishing its attendant advantages. It is therefore intended that such changes and modifications be covered by the following claims.

What is claimed is:

1. A dual deck video cassette system comprising:
    means defining a tuner for connection to a receiving antenna and constructed and arranged to demodulate the signal received by said antenna to extract a video-audio signal therefrom,
    means defining a first video cassette deck with record and playback capability,
    means defining a second video cassette deck with record and playback capability,
    means defining common housing of the two means defining video cassette decks,
    the first and second means defining video cassette decks being independently operable,
    means defining an output jack of the common housing connectable to a television receiver's reception port and comprising, at said output jack an R.F. modulator to reestablish a simulation of an on-the-air video-audio,
    switching means within said housing for selectively connecting: (1) the extracted off-the-air video-audio to one or the other of said decks and independently connecting the other of said decks to the television receiver via said modulator and output jack, (2) one deck to the other directly for dubbing a played out recorded video-audio of a source cassette in one of said decks directly to a target cassette in the other of said decks without passing the source signal through an R.F. modulator in the course of dubbing, while independently allowing direct transmission of an antenna signal of the system to said television receiver via the housing without passage through the tuner and modulator within said housing or without passage of such antenna signal or of the source signal through the modulator within said housing, (3) auxiliary input or output jacks to one or the other of said decks while allowing the other of said decks to be connected to another one of said auxiliary jacks or to the television receiver via said modulator; and (4) the extracted video-audio from the off-the-air signal simultaneously to: (i) said receiver, and (ii) as extracted, one or the other of said decks connected to an active auxiliary jack.

2. A dual deck video cassette system in accordance with claim 1 and further comprising an alternative housing output to enable provision of an unmodulated video-audio to a monitor such as the monitor portion of a television receiver.

3. A dual deck video system in accordance with claim 2 wherein said auxiliary jacks include one such jack constructed and arranged to accommodate video line input and output and another such jack constructed and arranged for direct connection to a camera video.

4. A dual deck video cassette system comprising:
    means defining a tuner for connection to a receiving antenna and constructed and arranged to demodulate the signal received by said antenna to extract a video-audio signal therefrom,
    means defining a first video cassette deck with record and playback capability,
    means defining a second video cassette deck with playback capability only,
    means defining common housing of the two means defining video cassette decks, the first and second means defining video cassette decks being independently operable, means defining an output jack of the common housing connectable to a television receiver's VCR reception jack and comprising at said housing jack an R.f. modulator to reestablish an on-the-air simulation of video-audio, switching means within said housing for selectively connecting: (1) the extracted off-the-air video-audio to said first deck and independently connecting the said second deck to the television receiver via said modulator and output jack, (2) the second deck to the first deck directly for dubbing a played out video-audio source signal of a cassette in said second deck directly to a cassette in the first deck without passing the source signal through an R.F. modulator in the course of dubbing, while independently allowing direct transmission of an antenna signal of the system to said television receiver via the housing without passage through the tuner and modulator within said housing or with passage of the antenna signal or the source signal through the modulator within said housing, and (3a) auxiliary jacks to one or the first deck while allowing the other of said decks to be connected to another one of said auxiliary jacks or to the television receiver via said modulator, (3b) input jacks to said first deck while allowing the second deck to be connected to said television receiver via said modulator.

5. A dual deck video cassette system in accordance with claim 4 and further comprising an alternative housing output to enable provision of an unmodulated video-audio to a monitor such as the monitor portion of a television receiver.

6. A dual deck video system in accordance with claim 5 wherein said auxiliary jacks include one such jack constructed and arranged to accommodate video line input and output and another such jack constructed and arranged for direct connection to a camera video.

7. A dual deck video cassette system comprising:
a. means defining a first video cassette deck having at least playback capability;
b. means defining a second video cassette deck having at least playback capability, at least one of said means defining a video cassette deck having recording capability;
c. means defining common housing of the two means defining video cassette decks;
d. the first and second means defining video cassette decks being independently operable;
e. means defining an output jack of the common housing connectable to a television receiver's reception port;
f. means defining an input jack of the common housing connectable to a television tuner for providing extracted off-the-air video-audio;
g. switching means within said housing for selectively connecting:
 (1) extracted off-the-air video-audio to one or the other of said decks and independently connecting the other of said decks to a television receiver via the output jack,
 (2) one deck to the other directly for dubbing a played out recorded video-audio of a source cassette in one of said decks directly to a target cassette in the other of said decks, while independently allowing direct transmission of an antenna signal of the system to the television receiver via the housing without passage through a tuner, or with passage of such antenna signal or of the source signal through a molulator in the housing,
 (3) auxiliary input or output jacks to one or the other of said decks while allowing the other of said decks to be connected to another one of said auxiliary jacks or to the television receiver,
 (4) the extracted video-audio from the off-the-air signal simultaneously to: (a) the receiver and, as (b) extracted, one or the other of said decks which is connected to an active auxiliary jack, or
 (5) the extracted video-audio from the off-the-air signal to both said decks for simultaneous copying onto cassettes located in both said decks and, selectively, the extracted video-audio, via the modulator, or the off-the-air signal directly to the receiver, or either of the decks to the receiver.

8. A dual deck video cassette system comprising:
a. means defining a first video cassette deck having at least playback capability;
b. means defining a second video cassette deck having at least playback capability, at least one of said means defining a video cassette deck having recording capability;
c. means defining common housing of the two means defining video cassette decks;
d. the first and second means defining video cassette decks being independently operable;
e. means defining an output jack of the common housing connectable to a television receiver's reception port;
f. means defining an input jack of the common housing connectable to a television tuner for providing extracted off-the-air video-audio;
g. switching means within said housing for selectively connecting:
 (1) the extracted off-the-air video-audio to said first deck and independently connecting the said second deck to the television receiver via said output jack,
 (2) the second deck to the first deck directly for dubbing a played out video-audio source signal of a cassette in said second deck directly to a cassette in the first deck, while independently allowing direct transmission of an antenna signal to the television receiver via the housing,
 (3) auxiliary jacks to one or the other of said decks while allowing the other of said decks to be connected to another one of said auxiliary jacks,
 (4) input jacks to said first deck while allowing the second deck to be connected to the television receiver, or
 (5) the off-the-air signal simultaneously to said receiver and the extracted video-audio therefrom to said first deck.

* * * * *